Patented Dec. 16, 1947

2,432,665

UNITED STATES PATENT OFFICE 2,432,665

LIQUID POLYMERIC PHENYLALKYL-SILOXANES

James Franklin Hyde, Corning, N. Y., assignor to Corning Glass Works, Corning, N. Y., a corporation of New York No Drawing. Application September 10, 1945, Serial No. 615,505

6 Claims. (Cl. 260—607)

This invention relates to new compositions of matter and their preparation and, more particularly, to high polymeric organosilicon liquids and methods of preparing them.

This application is a continuation-in-part of my copending application Serial No. 481,154, filed March 30, 1943, and assigned to the assignee of the present invention.

Hydrolysis of hydrolyzable silanes of the general formula

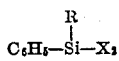

where R is a lower alkyl radical and X is either an ethoxy or a chlorine radical, produces the corresponding silanols, thus:

I.

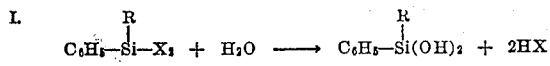

The phenyl alkyl silanols can be isolated as such; however, they are readily condensed to polymeric compositions known as silicones or silanones, thus:

II.

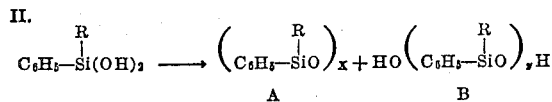

Heat and/or the presence of alkali or acid accelerates the above condensation.

The phenyl alkyl silicones are polymeric materials of either cyclic configuration as represented by Formula A above or of unbranched chain structure as shown by Formula B. Both types of polymers may be present in the same condensation product. Furthermore, where the starting hydrolyzable silane has ethoxy groups as the hydrolyzable constituents the unbranched chain polymers may have ethoxy radicals terminating one or both ends of the chain.

In general, the products obtained by the hydrolysis of hydrolyzable phenyl alkyl silanes are low molecular weight compositions even when the conditions are optimum for promoting condensation. They consist at best of polymers whose average number of silicon atoms per molecule is less than eight. The trimeric and tetrameric polymers are predominant, particularly the cyclic forms. These low molecular weight products are either crystalline solids or thin liquids having a viscosity less than 500 centistokes. It is not possible to increase their viscosity appreciably by heat alone.

For many industrial applications, hydraulic fluids, damping media, lubricants, etc., are required which have a viscosity above 1000 centistokes and which will not resinify or gel when heated for prolonged periods at high temperatures. The viscosity of the above products may be increased by blowing air through them at elevated temperatures or by treating them with aqueous acids of the strong type, also at elevated temperatures. However, both of these methods result in the removal of some of the organic radicals, the alkyl in the case of the air treatment and the phenyl in the case of the acid treatment. The resulting products therefore contain some mono-organo-substituted silicon units within their structures and have a tendency to increase in viscosity and finally resinify or gel when exposed to high temperatures for prolonged periods of time. It would be highly desirable if liquids could be prepared which had a viscosity above 1000 centistokes and which would remain substantially unchanged when exposed to elevated temperatures for long times as well as possessing the ability to lubricate.

The primary object of this invention is to prepare organo-silicon compositions which have a viscosity above 1000 centistokes; which are resistant to the effect of heat alone; and which are adapted to serve as lubricants.

Another object of the present invention is to provide methods of making the above compositions.

Further objects and advantages of this invention will become apparent from the following description and claims.

I have discovered that liquids having a viscosity above 1000 centistokes may be prepared from the hydrolysis products of hydrolyzable phenyl alkyl silanes. These liquids not only are not decomposed at temperatures of the order of 300° C. but also do not change appreciably in viscosity when heated to these temperatures for many hours. They possess a high degree of lubricity and accordingly are useful as lubricants and as hydraulic media.

These liquids are high molecular weight compositions which consist essentially of recurring structural units corresponding to the formula

where R is either a methyl or an ethyl radical. They may be prepared in the following manner.

A hydrolyzable organo-silane of the general formula

where R is either a methyl or an ethyl radical and X is either a chlorine or an ethoxy radical is first hydrolyzed to the corresponding monomeric silanol. The latter can be condensed, if desired, to a low molecular weight siloxane by heat in the presence or absence of a condensation catalyst such as acid or alkali. A crystalline solid or a liquid of relatively low viscosity is obtained. Either may be employed in the subsequent reaction. This silanol or low molecular weight siloxane is treated with an anhydrous alkali metal hydroxide, such as solid sodium or potassium hydroxide at a temperature below 200° C. and preferably below 100° C. The amount of alkali is such that the ratio of the number of silicon atoms in the silicone to the number of alkali metal atoms in the hydroxide is greater than 10 to 1. The alkyl may be added in increments, if desired. The reaction is continued until the desired viscosity is obtained. The alkali may then be removed by washing with acidified water until the product is neutral. It is then washed with water and dried. By this treatment, if allowed to continue until no increase in viscosity is obtained, liquids are produced having little or no flow at room temperature.

In the above process, I have found that where liquids of the order of 100,000 centistokes viscosity or higher are desired, the ratio of silicon atoms in the silicone to the alkali metal atoms in the hydroxide should be between about 100 to 1 and 500 to 1. It is extremely important in this process if high viscosity fluids of the order of 10,000 centistokes viscosity or higher are to be obtained to be sure that the starting silanes are free of other silanes such as the mono-organo or tri-organo-substituted silanes. The presence of these silanes interferes with the production of high viscosity liquids by the above process.

Analysis of the products obtained by the above process showed them to consist of the recurring structural unit of the formula

in other words the alkali treatment had not effected removal of any organic radicals. Analysis also indicated the presence of hydroxyl groups and ethoxyl radicals (where the starting silane was an ethoxy derivative). The products were accordingly mainly mixtures of chain polymers whose recurring unit was $(C_6H_5)RSiO$, the chains being terminated by hydroxyl and/or ethoxyl groups. It is to be understood, however, that some of the polymers contained in the product may be cyclic in conformation, the essential ingredient being the unit $(C_6H_5)RSiO$.

The average number of structural units per molecule in the product was at least eight. It was impossible to determine accurately what the average molecular size was of the products having little or no flow at room temperature.

The high polymeric liquids, namely, phenyl methyl polysilanone and phenyl ethyl polysilanone, particularly those having a viscosity between 1000 and 100,000 centistokes, are eminently adapted for use as hydraulic or damping fluids, dielectric media, and as lubricants between metallic surfaces such as steel and bronze. I have found that the presence of the phenyl radical greatly enhances the utility of the silicone as lubricants as contrasted with the dialkyl silicones. It has also been found advantageous to employ the high molecular weight liquids of this invention as intermediates for the preparation of resins by air-blowing them at elevated temperatures. The resins so obtained possess an unusually high degree of flexibility.

For a better understanding of my invention, reference should be had to the following examples.

*Example 1*

A sample of phenyl ethyl silicone having a viscosity of 60 centistokes was prepared by dropping phenyl ethyl silicon dichloride into aqueous ethyl alcohol and recovering the organo-silicone liquid formed. This liquid was treated with solid sodium hydroxide in such amount that the atomic ratio of Si/Na was equal to 25/1. The temperature was held at 130° to 140° C. for several hours. After washing out the alkali and drying by subjecting to vacuum, the viscosity of the product was 5023 centistokes.

*Example 2*

Liquid polymeric phenyl methyl silicone was treated with solid sodium hydroxide in an amount corresponding to a ratio of 50 silicon atoms to one sodium atom. The temperature of the mixture was held at about 150° C. for several hours until the viscosity appeared to attain a constant value. It was then found that the silicone had increased in viscosity from an initial value of 332 centistokes to a final value of about 1100 centistokes after the alkali had been removed by neutralization and washing.

*Example 3*

Phenyl ethyl silicone having a viscosity of 88 centistokes was prepared from phenyl ethyl silicon dichloride by treatment with water. Portions of the silicone were treated with powdered sodium hydroxide in such amounts that the atomic ratios of Si/Na were equal to 50/1 and 100/1, respectively. After several hours of alternate heating at 130° to 140° C. and placing under vacuum to remove water, the resulting liquids, when washed free of alkali, had viscosities of 7950 centistokes and 11,460 centistokes, respectively.

*Example 4*

Samples of phenyl ethyl silicone having a viscosity of 309 centistokes were treated with powdered sodium hydroxide and potassium hydroxide, respectively, in such amounts that the atomic ratio of Si/Na was equal to 200/1. After 48 hours at 60 to 80° C. and after drying with vacuum, the viscosities were 2348 and 3562 centistokes, respectively.

*Example 5*

A sample of phenyl ethyl silicone having a viscosity of 64 centistokes was treated with powdered sodium hydroxide in such amount that the atomic ratio of Si/Na was equal to 100/1. The mixture was stirred and heated from one to two hours at 80° to 100° C. under vacuum. After 17 days at room temperature, the viscosity of the product was 10,500 centistokes.

*Example 6*

Phenyl ethyl silicone was prepared from phenyl ethyl silicon dichloride by dropping 100 grams of the latter into 50 cc. of water at room temperature over a period of 3 hours. After washing out the acid with water and finally ammonia, the final product had a viscosity of 388 centistokes. A 55.8 gram sample was treated with powdered sodium hydroxide in such amount that the atomic ratio of Si/Na was equal to 300/1. Approximately 20 cc. of ether were added to the sample to help disperse the sodium hydroxide and the mixture was stirred at room temperature for 18 hours. After subsequently raising the temperature from 80° to 100° C. for four to five hours and removing any remaining ether under vacuum, the product had a viscosity of 15,150 centistokes.

*Example 7*

Phenyl ethyl silicone was prepared from phenyl ethyl silicon dichloride by dropping the chloride into water at room temperature. A liquid having a viscosity of 380 centistokes was obtained. Powdered sodium hydroxide in such amount that the atomic ratio of Si/Na was equal to 25/1 was added to the liquid and the mixture stirred at room temperature (temperature rose to 40° to 50° C. as the viscosity increased due to friction in stirring). Some of the moisture formed during the reaction evaporated. The following table shows the viscosities of the liquid at different periods of treatment:

| Time, Hours | Viscosity, Centistokes |
| --- | --- |
| 0 | 386 |
| 1 | 1,153 |
| 2¼ | 1,725 |
| 3 | 1,842 |
| 4 | 2,408 |
| 5 | 2,540 |
| 6 | 3,098 |
| 27½ | 13,200 |
| 76 | 37,200 |
| 94 | 48,200 |
| 120 | 78,500 |
| 162 | 110,000 |
| 238 | 125,600 |

*Example 8*

A sample of the cyclic trimer of phenyl ethyl silicone was treated with powdered sodium hydroxide in such amount that the atomic ratio of Si/Na was equal to 100/1 and heated to around 60° C. with stirring. After 24 hours the treated trimer had a viscosity of 10,920 centistokes and at 96 hours its viscosity was approximately 1,000,000 centistokes or 94.5 centistokes in a 50% toluene solution. It was then dissolved in toluene and heated for an additional 66 hours at 60°–70°C. The product after removal of the alkali by washing had a viscosity of 125 centistokes in a 50% toluene solution at 25° C. Removal of solvent left a material having little flow at room temperature.

*Example 9*

A 50 gram sample of phenyl ethyl silicone (viscosity 310 centistokes, 2.07%OH) was treated with powdered sodium hydroxide in such amount that the ratio of Si/Na was equal to 100/1. The sample was stirred at 60° C. in a rather deep layer in a test tube. After 24 hours the viscosity rose to 9,650 centistokes. After another 24 hours at the same temperature, the sample was dried by placing under vacuum and warming slightly. Its viscosity was 12,250 centistokes. Further heating at 60° C. with stirring for 18 hours raised the viscosity to 31,200 centistokes.

*Example 10*

Phenyl ethyl silicon dichloride was hydrolyzed by dropping slowly into enough water at room temperature to form 10% aqueous HCl. The isolated product had a viscosity of 309 centistokes and a hydroxy content of 3.54%. A 150 gram sample of this material was treated with .266 gram of solid sodium hydroxide in .524 gram of aqueous solution (Si/Na=150/1) and stirred at 80°–85° C. The viscosity rose steadily up to 48 hours at which point it was 56,000 centistokes.

*Example 11*

To a mixture of 78 g. of 95% ethanol, 108 g. of water and 0.6 g. of acetic acid, at 0° C., 23.0 g. of diethoxymethylphenylsilane was added dropwise. After addition was complete, the mixture was diluted with 200 ml. of water, salted and extracted with ether. From the ether extract 14.9 g. of product was obtained, which on diluting with a small amount of petroleum ether and cooling, yielded 11.5 g. of crystals. The crystals were a mixture of the monomeric and dimeric phenyl methyl diols. Repeated recrystallizations from combinations of petroleum ether with diethyl ether or benzene brought about some separation into fractions rich in the monomer diol (the less soluble constituent) and fractions in which the dimer diol was predominant. A fraction, containing 13.7% hydroxyl, weighing 1.83 g., was mixed with 0.0111 g. of powdered NaOH, three ml. of toluene and 4 ml. of ether. The alkali reacted and dispersed in about ten minutes. Solvents were removed under 15 mm. pressure at room temperature. After a day of such treatment, the resin, still under reduced pressure, was heated to 77° C. for 48 hours. It became steadily more viscous. The temperature was raised to 100° C. for 24 hours, after which the polymer was dissolved in ether, treated with acetic acid and washed to neutrality. Solvents and volatiles were removed under reduced pressure, leaving a thermoplastic composition having little flow at room temperature.

The viscosity of a 0.5% solution in toluene was 0.73 centistokes which corresponds to an intrinsic viscosity of 2.40. Even higher intrinsic viscosities may be obtained by continuing the above treatment for a longer period of time.

*Example 12*

To liquid polymeric phenyl ethyl silicone having a viscosity of 412 centistokes was added solid sodium hydroxide in an amount corresponding to a ratio of 100 silicon atoms to one sodium atom. The mixture was held at a temperature of about 150° C. for several hours. The product had a viscosity of over 20,000 centistokes. After being neutralized and washed, the product was applied to glass fibre tape and heated in air at 200° C. for 8 hours, and for 5 hours at 250° C. A resinous coating was produced which was tack-free and flexible.

I claim:

1. An organo-polysiloxane consisting essentially of the recurring structural unit corresponding to the formula $(C_6H_5)RSiO$ where R is selected from the class consisting of methyl and ethyl radicals, there being on the average at least eight of said units per molecule, said polysiloxane having a viscosity greater than 1000 centistokes and being free of monoorgano- and triorgano-substituted silicon units.

2. An organo-polysiloxane consisting essentially of the recurring structural unit corresponding to the formula $(C_6H_5)RSiO$ where R is selected from the class consisting of methyl and ethyl radicals, there being on the average at least eight of said units per molecule, said polysiloxane having a viscosity between 1000 and 100,000 centistokes and being free of monoorgano- and triorgano-substituted silicon units.

3. A phenyl methyl polysiloxane consisting essentially of the recurring structural unit corresponding to the formula $(C_6H_5)(CH_3)SiO$, there being on the average at least eight of said units per molecule, said polysiloxane having a viscosity greater than 1000 centistokes and being free of monoorgano- and triorgano-substituted silicon units.

4. A phenyl methyl polysiloxane consisting essentially of the recurring structural unit corresponding to the formula $(C_6H_5)(CH_3)SiO$, there being on the average at least eight of said units per molecule, said polysiloxane having a viscosity between 1000 and 100,000 centistokes and being free of monoorgano- and triorgano-substituted silicon units.

5. A phenyl ethyl polysiloxane consisting essentially of the recurring structural unit corresponding to the formula $(C_6H_5)(C_2H_5)SiO$, there being on the average at least eight of said units per molecule, said polysiloxane having a viscosity greater than 1000 centistokes and being free of monoorgano- and triorgano-substituted silicon units.

6. A phenyl ethyl polysiloxane consisting essentially of the recurring structural unit corresponding to the formula $(C_6H_5)(C_2H_5)SiO$, there being on the average at least eight of said units per molecule, said polysiloxane having a viscosity between 1000 and 100,000 centistokes and being free of monoorgano- and triorgano-substituted silicon units.

JAMES FRANKLIN HYDE.

REFERENCES CITED

The following references are of record in the file of this patent:

UNITED STATES PATENTS

| Number | Name | Date |
| --- | --- | --- |
| 2,258,222 | Rochow | Oct. 7, 1941 |

FOREIGN PATENTS

| Number | Country | Date |
| --- | --- | --- |
| 113,708 | Australia | Sept. 4, 1941 |

OTHER REFERENCES

Robison et al., Jour. Chem. Soc. (London), vol. 101 (1912), p. 2159.